(12) United States Patent
Perie

(10) Patent No.: US 7,264,348 B2
(45) Date of Patent: Sep. 4, 2007

(54) SPECTACLES OF THE RIMLESS TYPE HAVING HINGE-LESS WIRE SIDE-ARMS THAT ARE DEFORMABLE IN FLEXING

(75) Inventor: Jean-Claude Perie, Montauban (FR)

(73) Assignee: Minima, Linas (FR)

( * ) Notice: Subject to any disclaimer, the term of this patent is extended or adjusted under 35 U.S.C. 154(b) by 370 days.

(21) Appl. No.: 11/066,637

(22) Filed: Feb. 25, 2005

(65) Prior Publication Data

US 2006/0055874 A1   Mar. 16, 2006

(30) Foreign Application Priority Data

Aug. 19, 2004   (FR) .................................. 04 08983

(51) Int. Cl.
G02C 1/02 (2006.01)
(52) U.S. Cl. ...................... 351/110; 351/124
(58) Field of Classification Search ................ 351/110, 351/124, 111, 116, 140, 153; 16/228
See application file for complete search history.

(56) References Cited

U.S. PATENT DOCUMENTS

| 3,756,704 A | * | 9/1973 | Marks ........................ 351/60 |
| 5,367,344 A | * | 11/1994 | Fuchs ......................... 351/41 |
| 5,585,870 A | * | 12/1996 | Masunaga .................. 351/106 |
| 5,835,183 A |   | 11/1998 | Murai et al. ................ 351/110 |
| 5,896,186 A | * | 4/1999 | Roban ........................ 351/110 |
| 6,007,200 A | * | 12/1999 | Tachibana .................. 351/110 |
| 6,139,143 A | * | 10/2000 | Brune et al. ................ 351/153 |
| 6,447,117 B1 |  | 9/2002 | Estrada et al. .............. 351/110 |
| 6,719,425 B2 | * | 4/2004 | Conner ....................... 351/111 |
| 7,044,596 B2 | * | 5/2006 | Park ........................... 351/103 |
| 2001/0019395 A1 |  | 9/2001 | Weber ........................ 351/124 |
| 2004/0051843 A1 |  | 3/2004 | Carlon ....................... 351/124 |

FOREIGN PATENT DOCUMENTS

| EP | 0 814 359 A1 | 12/1997 |
| EP | 1 107 042 | 6/2001 |
| EP | 1 382 988 | 1/2004 |
| JP | 2002-318372 | 4/2001 |
| WO | WO96/05535 | 12/1994 |
| WO | WO 00/26716 | 5/2000 |
| WO | WO 02/21193 | 3/2002 |
| WO | WO 02/095481 | 11/2002 |
| WO | WO 02/095482 | 11/2002 |
| WO | WO 03/014804 | 2/2003 |
| WO | WO 03/083553 | 10/2003 |
| WO | WO 2004/003632 | 1/2004 |

* cited by examiner

*Primary Examiner*—Hung Xuan Dang
(74) *Attorney, Agent, or Firm*—McCormick, Paulding & Huber LLP

(57) ABSTRACT

The invention relates to spectacles of the rimless-type, comprising a bridge interconnecting two lenses, and two side arms that are hinge-less wire structures suitable for flexing. According to the invention, each side arm presents a distal end arranged to fasten to the side zone of the corresponding lens, said distal end being substantially J-shaped, with a long portion passing through a through bore in the lens, with a pliable clamping plug being interposed that holds the distal end in place, and an anti-pivot short portion extending backwards and passing into an outwardly-open side notch, without clamping the lens between said long portion and said short portion, the central portion that interconnects the long portion and the short portion extending close to the front face of the lens.

12 Claims, 4 Drawing Sheets

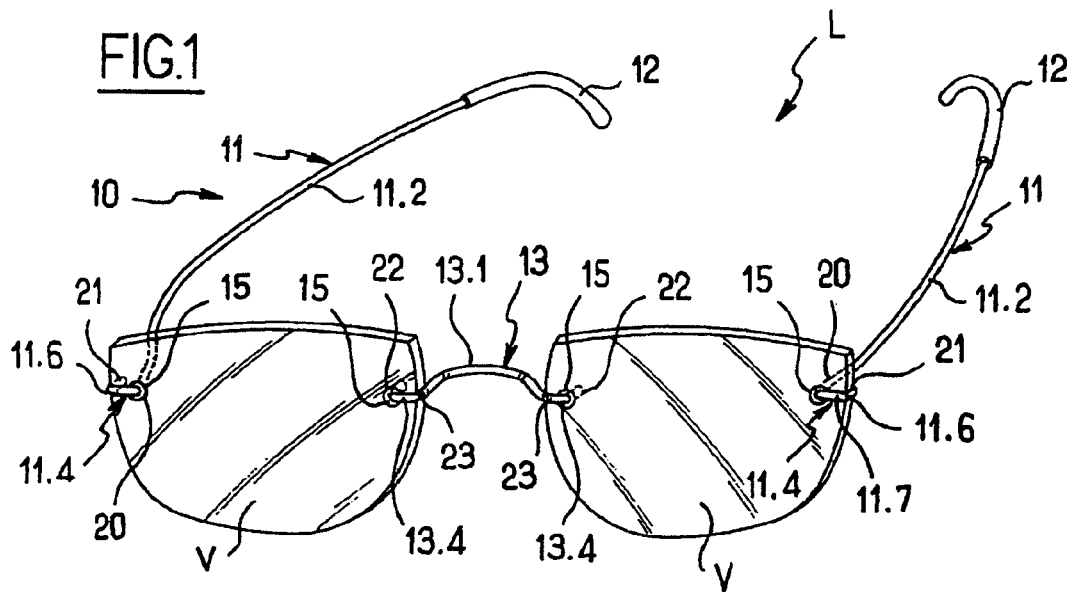
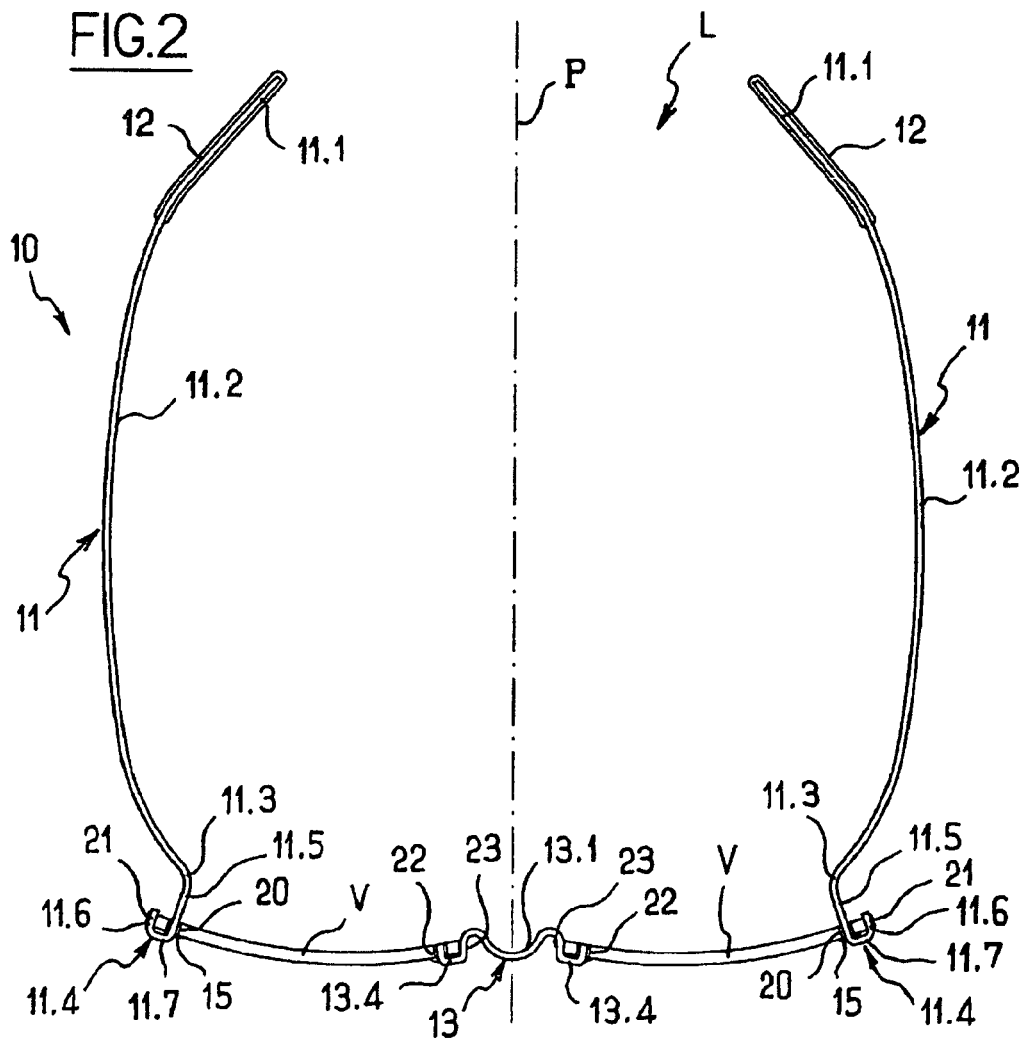

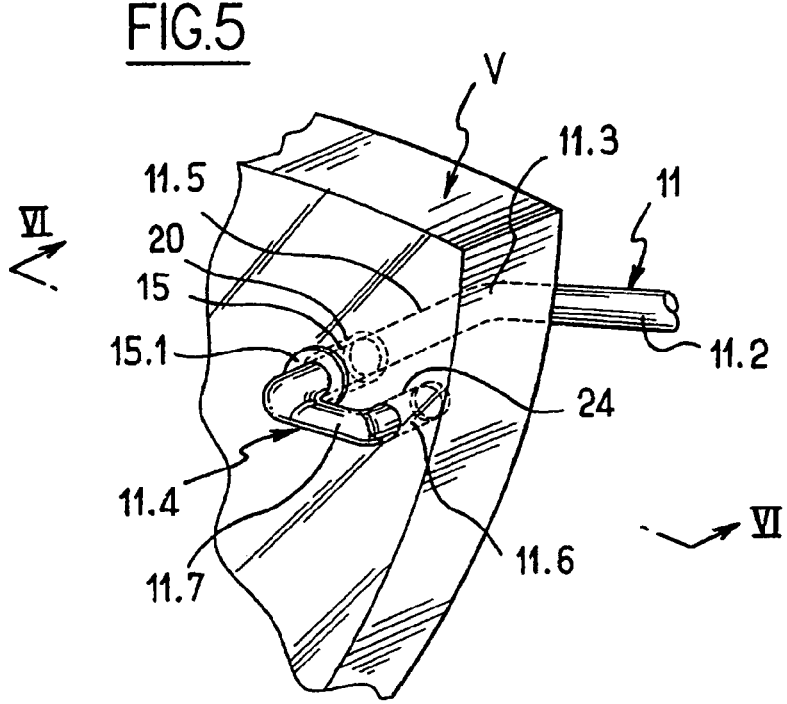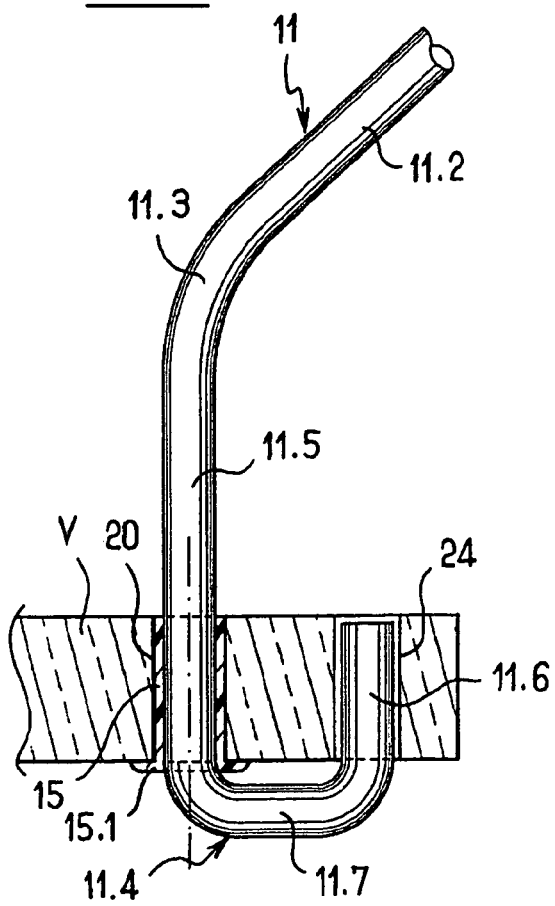

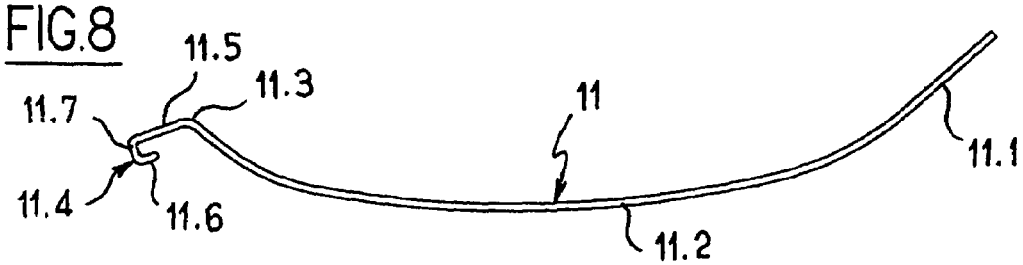
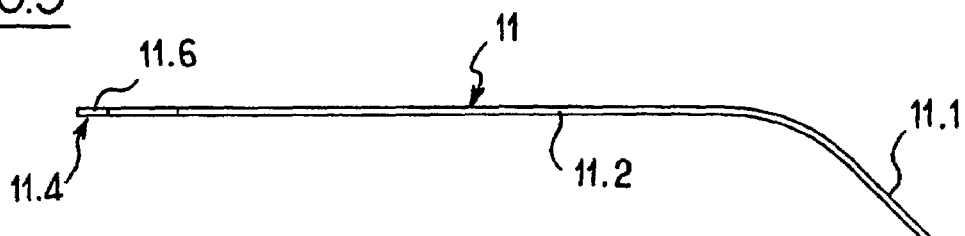
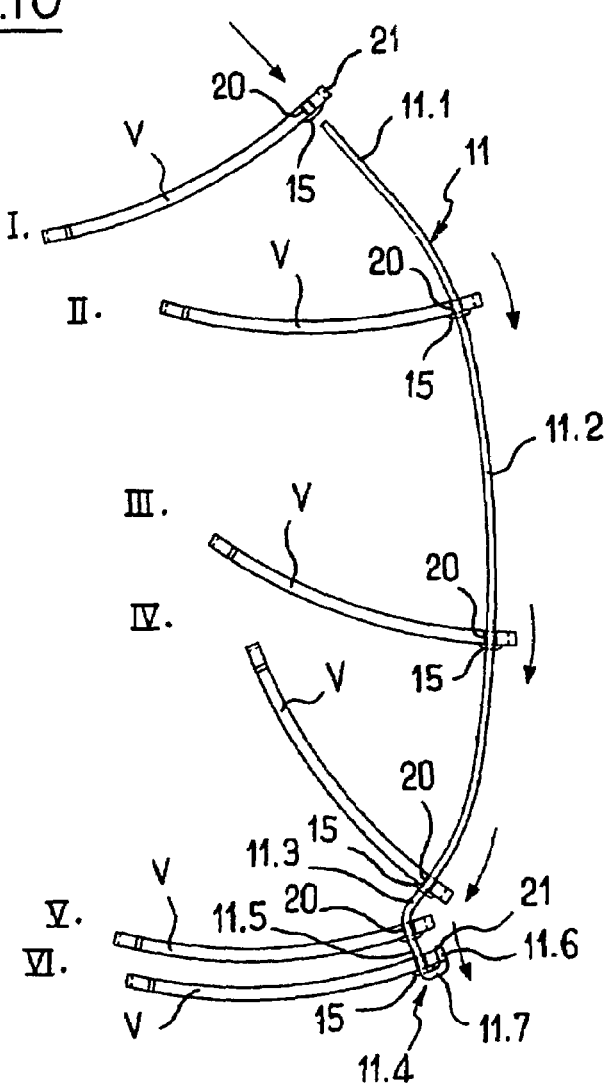

SPECTACLES OF THE RIMLESS TYPE HAVING HINGE-LESS WIRE SIDE-ARMS THAT ARE DEFORMABLE IN FLEXING

CROSS-REFERENCE TO RELATED APPLICATION

This application is entitled to the benefit of and incorporates by reference essential subject matter disclosed in French Application No. 0408983 filed on Aug. 19, 2004.

FIELD OF THE INVENTION

The present invention relates to the field of spectacles of the rimless type, comprising a bridge interconnecting two lenses, and two side arms (or "temples") connected to respective side zones of the corresponding lenses.

BACKGROUND OF THE INVENTION

Rimless spectacles or spectacles where mounting is via bores provided through the thickness of each lens, are in increasingly widespread use.

Reference can be made to Documents WO-2004/003632A, WO-02/21193A, EP-61107042A, WO-96/05535A, U.S. Pat. No. 66,447,117A, WO-00/26716A, EP-1382988A, WO-03/014804A, WO-02/095482A and WO-02/095481A.

In most of the above-cited arrangements, each lens is provided with a through bore and with an outwardly-open side notch, or else with two through bores for respective ones of the component elements of the frame, namely the bridge and the two side arms.

Document U.S. Pat. No. 5,835,183 A provides hinge elements that are fixed to the side portions of the lenses via respective S-shaped portions. The free end of each of the S-shaped portions passes through a through bore, and its central branch passes through an outwardly-open side notch. The end portion thus forms a loop, which is designed to clamp the intermediate portion of the lens resiliently, the clamping being reinforced by elements for increasing friction resistance, in particular by means of teeth biting into the surface of the corresponding lens in the through bore and in the outwardly-open side notch. However, that suffers from the drawback of degrading the surface of the lens that is thus scraped by the teeth, and of weakening that zone of the lens which is clamped between the two clamp-forming portions of arm, which zone is sometimes narrow.

Documents JP2002/318 372 A and EP 0 814 359 A illustrate wire frames having arms that are provided with hinges or else that are not provided with hinges but that are suitable for flexing. Each of those arms presents a distal end that is hook-shaped, and an arm end portion passing into an outwardly-open side notch in the corresponding lens, and a short clamping portion passing through a bore in the lens, these two portions forming a clamp that clamps that portion of the lens which lies between the bore and the outwardly-open side notch in order to hold the arm in place. Clamping of the lens is further reinforced in the arrangement of Document JP 2002/318 372A due to the short portion sloping towards the arm end portion, and due to the axis of the bore through the lens sloping correspondingly, optionally with a plug being interposed in the notch so that, via its flange, it forms a spacer preventing the clamping from loosening.

It has also been proposed to make rimless-type spectacles whose side arms are suitable for flexing without being hinged. For that purpose, a forming technique is used that makes advantageous use of the shape memory capacities of certain metal alloys. For fastening such hinge-less flexing arms, use is generally made of studs that are fitted into bores, as described, for example, in Documents WO-03/083553A and U.S. Pat. No. 5,367,344A.

In most cases, the fastening ends of the side arms present complex configurations, with multiple bends, involving a manufacturing cost that is high. In addition, it is sometimes necessary to form said bends in situ, after threading a rectilinear and not yet bent arm end into a bore through the glass, which is particularly awkward for the operator.

SUMMARY OF THE INVENTION

An object of the present invention is to propose rimless-type spectacles that offer higher performance both by the simplicity of their structure and by the ease with which they can be assembled.

That problem is solved in accordance with the invention by means of spectacles of the rimless-type, comprising a bridge interconnecting two lenses, and two side arms connected to respective side zones of the corresponding lenses, said side arms being hinge-less wire structures suitable for flexing, said spectacles being remarkable in that each side arm presents a distal end arranged to fasten to the side zone of the corresponding lens, said distal end being substantially J-shaped, with a long portion extending the main portion of the arm and passing through a through bore in the lens, with a pliable clamping plug being interposed that holds the distal end in place, and an anti-pivot short portion extending backwards and passing into an outwardly-open side notch or into another through bore in the lens, without clamping the lens between said long portion and said short portion, the central portion that interconnects the long portion and the short portion extending close to the front face of the lens.

Preferably, each side arm has a main portion and a long portion at its distal end, which portions are shaped in cross-section and in profile to pass through the through bore in the lens, so as to enable said side arm to be put in place merely by being threaded through from the front face of the lens. Putting the side arm in place is thus considerably facilitated, and it can be performed without using any tool. The coupling between the side arm and the lens is also very reliable, with lasting clamping at the pliable plug, and without clamping the lens between the long and the short portions of the J-shaped distal end.

It is possible to make provision for each side arm to be constituted by a single metal piece, or, in a variant, to be made up of a plurality of pieces that are fitted together.

The J-shaped distal end of each side arm advantageously extends in a substantially horizontal plane.

Preferably, the main portion of each side arm presents a flattened central portion increasing the flexibility of said arm in the directions in which said arm is flexed.

It is possible to make provision for the distal end long portion of each side arm to be provided with projecting teeth or spikes that anchor into the pliable clamping plug when said side arm is in place.

Advantageously, the distal end long portion of each side arm is connected to the main portion of the arm via a permanent bend forming an obtuse angle.

It is also possible to make provision for the distal end long portion of each side arm to extend from the back of the lens in rectilinear manner over a distance of not less than the thickness of the lens. This makes it possible to facilitate any disassembly for the purpose of disuniting a side arm from the corresponding lens.

Advantageously, each pliable clamping plug is a separate piece that is inserted into the corresponding bore in the lens. In particular, at one of its ends, each pliable clamping plug has a collar that comes into abutment against one face of the corresponding lens. This makes it possible for the pliable plug to be positioned with precision, without any risk of said plug being expelled while the side arm is being mounted.

In a variant, it is possible to make provision for each pliable clamping plug to be formed in situ when the associated side arm is in place, by molding or injecting a plastics material in or into the corresponding bore in the lens.

Preferably, each side arm is made of metal wire, in particular titanium wire, of round cross-section that is optionally flattened vertically in its main portion.

In a variant, it is possible to make provision for each side arm to be made of a plastics material, in particular of polyacetate or of polycarbonate.

BRIEF DESCRIPTION OF THE DRAWINGS

Other characteristics and advantages of the invention appear more clearly from the following description given with reference to the accompanying drawings which show a preferred embodiment, and in which:

FIG. 1 is a perspective view of rimless-type spectacles of the invention;

FIG. 2 is a plan view of the above-mentioned spectacles, showing the fastening ends of the side arms by transparency;

FIG. 5 is a perspective view showing a variant in which the anti-pivot short portion passes into another through bore in the lens;

FIG. 6 is a section view on VI-VI of FIG. 5;

FIG. 7 is a fragmentary view of the distal end of a side arm presenting projecting teeth for anchoring into the pliable clamping plug;

FIGS. 8 and 9 are respectively a plan view and a side view of a side arm whose proximal end presents no covering element such as a sleeve or a ball, this situation corresponding to the initial mounting of the side arm; and FIG. 10 is a diagrammatic view showing the various relative positions between the above-mentioned side arm and the corresponding lens while said side arm is being threaded through from the front face of said lens.

DETAILED DESCRIPTION OF A PREFERRED EMBODIMENT

Figure 3:
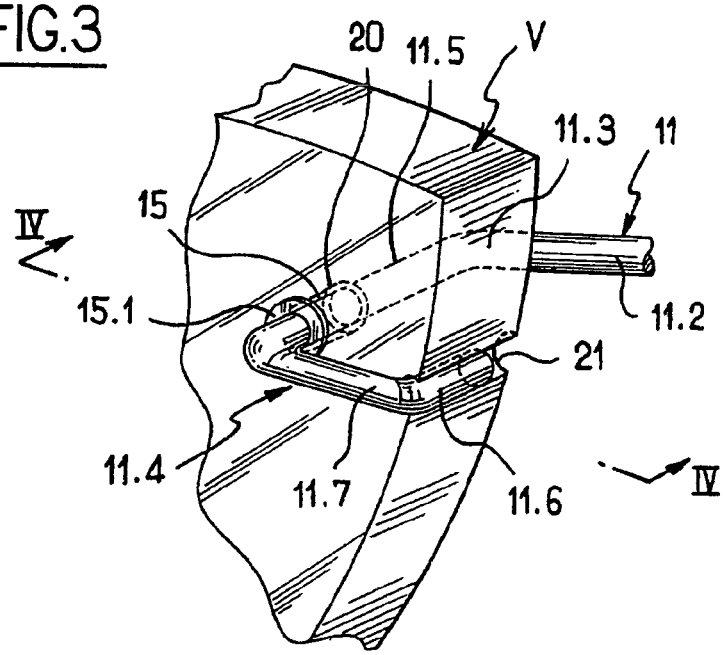
FIG. 3 is a fragmentary perspective view on a larger scale, enabling the fastening zone in which a side arm is fastened to be seen more clearly.

As shown in FIGS. 1 and 2, the invention relates to rimless-type spectacles. Said spectacles comprise two lenses V and a frame 10 which is of the wire type. The frame 10 comprises a bridge 13 interconnecting the two lenses V, and two side arms 11 connected to respective zones of the corresponding lenses V.

Not only are the side arms 11 of wire structure, but they are also hinge-less and suitable for flexing. This is clearly visible in FIG. 2, in which it can be observed that each side arm is implemented continuously in one piece, without any vertical-axis hinge element being present.

In this example, the proximal ends 11.1 of the side arms 11 are covered with respective covering elements 12 which can be sleeves, or, in a variant, balls or the like.

Each side arm 11 thus presents, in succession, a proximal end 11.1, covered with a sleeve 12 in this example, then a main portion 11.2 which is slightly curved, and which extends to a permanent bend 11.3 forming an obtuse angle. Beyond said bend 11.2, there is a distal end 11.4 that is arranged to fasten to the side zone of the corresponding lens V.

Said distal end 11.4 is substantially J-shaped (as seen from above or from below, depending on which arm is being looked at), with a long portion 11.5 and a short portion 11.6, said portions being interconnected by a central portion 11.7.

According to an essential aspect of the invention, the long portion 11.5 extending the main portion 11.2 of the arm passes through a through bore 20 in the lens V, with a pliable clamping plug 15 being interposed that holds the distal end 11.4 in place, and the short backwardly-extending anti-pivot portion 11.6 passes either into an outwardly-open side notch 21, as can be seen more clearly in the details of FIGS. 3 and 5, or, in a variant, into another through bore 24, as can be seen in FIGS. 5 and 6, without clamping the lens between the long portion 11.5 and the short portion 11.6, the central portion 11.7 extending close to the front face of the lens V.

The bridge 13, also of wire structure, is of conventional design, with a curved main portion 13.1, and two fastening side ends 13.4, each of which co-operates with a respective bore 22 and with a respective outwardly-open side notch 23 in the corresponding lens V for the purpose of coupling the bridge to both lenses. The fastening portions 13.4 of the bridge thus differ from the fastening portions of the side arms since each of the bridge fastening portions fastens to the zone of the corresponding lens merely by resilience. It is also possible, for each end of the bridge that passes through a through hole 22, to make provision to interpose a pliable clamping plug analogous to the plugs 15 used to hold the side arms. It is also possible to provide a bridge having a different structure, and in particular a structure arranged to carry nose pads.

With reference to FIG. 2, it can be seen that the long portion 11.5 is further towards the inside of the lens than the short portion 11.6, and that the long portion 11.5 passes through a through bore 20 in said lens. This arrangement goes against the above-mentioned conventional arrangements that present distal fastening ends that are hook-shaped, in that such prior arrangements always have an arm end portion that passes through an open notch and a clamping short portion that passes into a bore in the lens, the two portions together forming a clamp that clamps onto the relevant portion of the lens. Therefore, when moving the arms, and especially insofar as they are hinge-less wire arms suitable for being flexed, non-negligible forces are exerted where the arms are anchored to the lenses. With the arrangement of the invention, the engagement through a through bore procures an extremely favorable lateral abutment effect that cannot be obtained in the prior art with engagement into an outwardly-open side notch.

Figure 4:
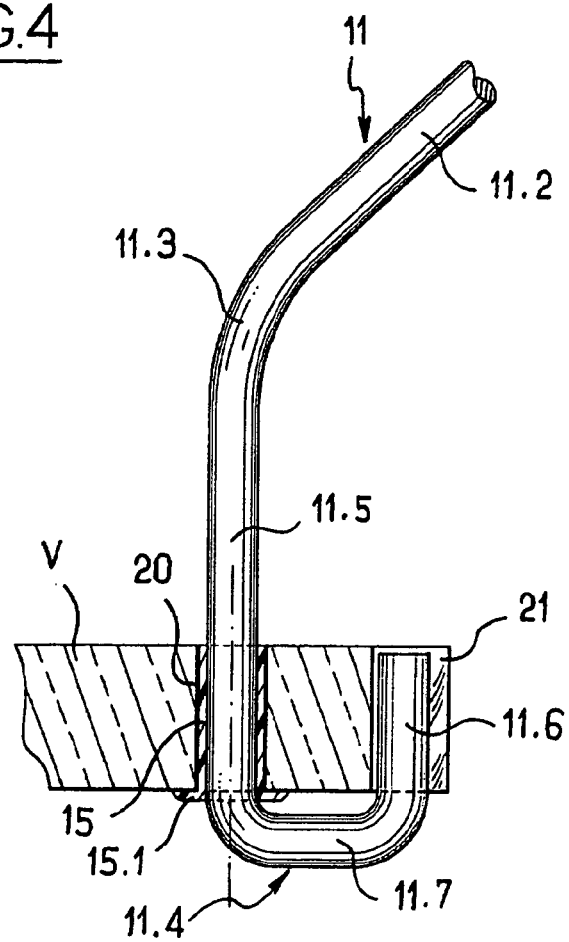
FIG. 4 is a section view on IV-IV of FIG. 3.

FIGS. 3 and 4 enable the arrangement of the invention to be better understood.

In this example, it can be seen that the J-shaped distal end 11.4 of each side arm 11 extends in a substantially horizontal plane. This makes it possible to avoid any unwanted twisting of the arm while it is being flexed.

In addition, the long portion 11.5 at the distal end of each side arm 11 is connected to the main portion 11.2 of the arm via a permanent bend 11.3 that forms an obtuse angle.

Furthermore, said long portion 11.5 extends from the back of the lens V and rectilinearly over a distance of not less than the thickness of the lens, as can be seen more clearly in FIG. 4. This makes it possible to facilitate any subsequent disengagement for removing the side arm.

It is also possible to see a pliable clamping plug 15 which, in this example, has a collar 15.1 at one end that comes into abutment against one of the faces of the corresponding lens V. In practice, and as explained below with reference to FIG. 10, each side arm 11 is mounted merely by threading it through from the front of the lens, so that it appears preferable to dispose the pliable plug 15 in a manner such that its collar 15.1 comes into abutment against the front face of the lens. This makes it possible to ensure that the pliable clamping plug 15 is not expelled while the side arm is being passed through the bore.

In this example, the pliable clamping plug 15 is a separate piece that is inserted into the corresponding bore in the glass. In a variant, it is possible to make provision for the pliable clamping plug 15 to be formed in situ once the associated side arm 11 is in place, by molding or injecting a plastics material, e.g. silicone, in or into the corresponding bore in the lens.

As can be seen in FIG. 4, the short portion 11.6, which, in this example, is received in the outwardly-open side notch 21, does not press against the relevant portion of the lens by forming a clamp as is frequently the case in prior art arrangements. Instead, the short portion 11.6 serves merely to provide an anti-pivot function, while the function of holding the arm in place is provided exclusively by the long portion 11.5 which is locked in its pliable clamping plug 15.

FIGS. 5 and 6 show a variant in which, instead of passing into an outwardly-open side notch as in the preceding figures, the short backwardly-extending anti-pivot portion 11.6 passes into another through bore 24 in the lens. Otherwise, the configuration is identical to the configuration described with reference to the preceding figures.

In a variant, it is possible to turn the J the other way round, provided however that the long portion still remains in a bore, and is not positioned in an outwardly-open side notch as it is in prior art arrangements. Otherwise, the above-mentioned abutment effect would be lost.

As shown in FIG. 7, it is possible to make provision for the long portion 11.5 at the distal end of each side arm 11 to present projecting teeth or spikes 11.8 which anchor into the pliable clamping plug 15 when the side arm is in place.

In another important aspect of the invention, each side arm 11 has a main portion 11.2 and a long portion 11.5 at its distal end, which portions are shaped in section and in profile to pass through the through bore 20 in the lens V, so as to enable said side arm to be put in place merely by being threaded through from the front face of the lens.

FIGS. 8 and 9 make it possible to see the shape of a side arm 11 more clearly, and it can be noted that its proximal end 11.1 is not covered with a sleeve or the like. Said side arm 11 is preferably made of metal wire, in particular titanium wire, with a cross-section that is round and optionally vertically flattened locally in its main portion 11.2 in order to increase the flexibility of said arm in the directions in which it is flexed. In a variant, the side arm 11 can be made of a plastics material, in particular of polyacetate or of polycarbonate.

In this example, each side arm 11 is made of one piece, but, in a variant not shown herein, it is possible for the side arm to be made up of a plurality of pieces that are fitted together. Similarly, it is possible to use a cross-section of different shape, e.g. flat, the bore and the notch then being shaped to match the shape of the cross-section.

FIG. 10 shows the process of manually putting a side arm in place merely by threading it through from the front face of the corresponding lens V.

In FIG. 10, various relative positions between the lens and the side arm are shown.

In position I, the tip of the proximal end 11.1 of the arm 11 is facing the through bore 20, which, in this example, is provided with its pliable clamping plug 15 so as to be ready for the threading.

The positions II, III, IV, and V correspond to successive threading positions, during which the various portions of the wire arm pass through the through bore 20 lined with its pliable plug 15 until the fastening distal end 11.4 of said arm is reached. The last stage of movement, to reach the final position VI, is mere rectilinear sliding to bring the short portion 11.6 into the outwardly-open side notch 21 in the lens.

It can thus be observed that the side arm 11 can be mounted quickly and easily, and without using any special tool.

If it is then desired to separate the assembly, it suffices to reverse the process, thereby making it possible to change the side arm while retaining the same lens, or vice versa.

As indicated above, the fastening distal end 11.4 is held in place solely by the pliable clamping plug 15, which is constituted by a separate piece or which is made in situ by being molded in or injected into the bore in the lens. For example, it is possible to use a pliable material such as a polyamide 6 or silicone, such materials also being transparent and therefore being less visible.

The invention is not limited to the above-described embodiment, but rather it covers any variant using equivalent means to reproduce the above-mentioned essential characteristics.

What is claimed is:

1. Spectacles of the rimless-type, comprising a bridge interconnecting two lenses, and two side arms connected to respective side zones of the corresponding lenses, said side arms being hinge-less wire structures suitable for flexing, wherein each side arm presents a distal end arranged to fasten to the side zone of the corresponding lens, said distal end being substantially J-shaped, with a long portion extending the main portion of the arm and passing through a through bore in the lens, with a pliable clamping plug being interposed that holds the distal end in place, and an anti-pivot short portion extending backwards and passing into an outwardly-open side notch or into another through bore in the lens, without clamping the lens between said long portion and said short portion, the central portion that interconnects the long portion and the short portion extending close to the front face of the lens.

2. Spectacles according to claim 1, wherein each side arm has a main portion and a long portion at its distal end, which portions are shaped in cross-section and in profile to pass through the through bore in the lens, so as to enable said side arm to be put in place merely by being threaded through from the front face of the lens.

3. Spectacles according to claim 1, wherein each side arm is constituted by a single metal piece.

4. Spectacles according to claim 1, wherein the J-shaped distal end of each side arm extends in a substantially horizontal plane.

5. Spectacles according to claim 1, wherein the main portion of each side arm presents a flattened central portion increasing the flexibility of said arm in the directions in which said arm is flexed.

6. Spectacles according to claim 1, wherein the long portion at the distal end of each side arm is provided with projecting teeth or spikes that anchor into the pliable clamping plug when said side arm is in place.

7. Spectacles according to claim 1, wherein the long-portion at the distal end of each side arm is connected to the main portion of the arm via a permanent bend forming an obtuse angle.

8. Spectacles according to claim 1, wherein the long portion at the distal end of each side arm extends from the back of the lens in rectilinear manner over a distance of not less than the thickness of the lens.

9. Spectacles according to claim 1, wherein each pliable clamping plug is a separate piece that is inserted into the corresponding bore in the lens.

10. Spectacles according to claim 9, wherein, at one of its ends, each pliable clamping plug has a collar that comes into abutment against one face of the corresponding lens.

11. Spectacles according to claim 1, wherein each pliable clamping plug is formed in situ when the associated side arm is in place, by molding or injecting a plastics material in or into the corresponding bore in the lens.

12. Spectacles according to claim 1, wherein each side arm is made of metal wire, in particular titanium wire, of round cross-section that is optionally flattened vertically in its main portion.

* * * * *